Dec. 31, 1957 A. G. FRITZ 2,817,860
HELICOPTER RESCUE SEINE
Filed Jan. 3, 1957 2 Sheets-Sheet 1
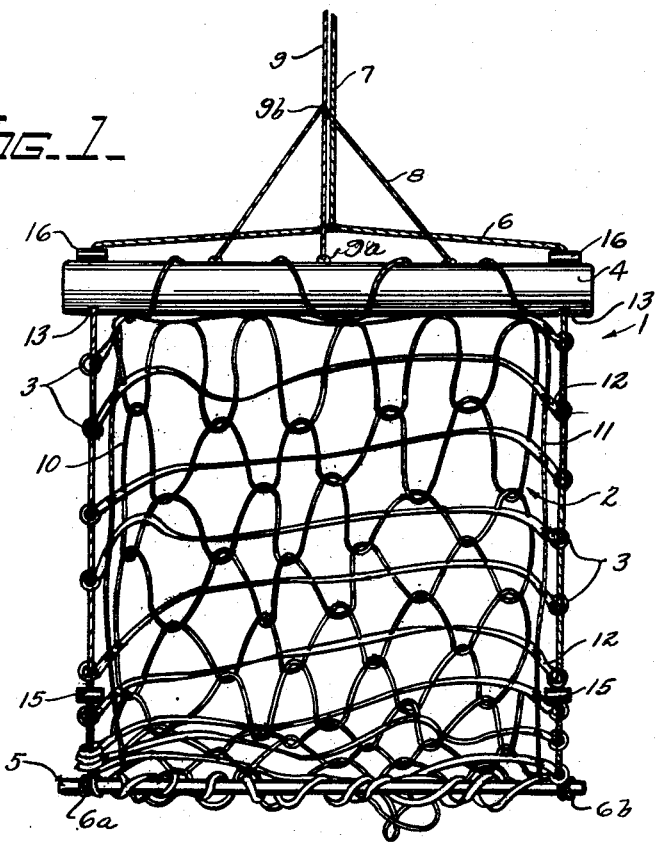
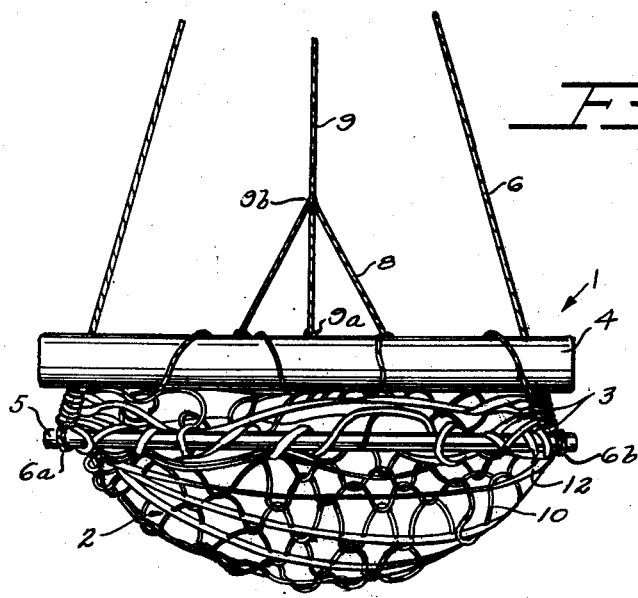
INVENTOR.
ALFRED G. FRITZ
BY
ATTORNEY
AGENT Dec. 31, 1957

A. G. FRITZ 2,817,860

HELICOPTER RESCUE SEINE

Filed Jan. 3, 1957

INVENTOR.
ALFRED G. FRITZ

BY Wade Koontz
ATTORNEY
Arthur B. Parker and
AGENT

2,817,860

HELICOPTER RESCUE SEINE

Alfred G. Fritz, Dayton, Ohio

Application January 3, 1957, Serial No. 632,402

8 Claims. (Cl. 9—14)

(Granted under Title 35, U. S. Code (1952), sec. 266)

The invention described herein may be manufactured and used by or for the United States Government for governmental purposes without payment to me of any royalty thereon.

This invention relates generally to a device for retrieving victims of ship or airplane wrecks or objects washed overboard, and more particularly, to a rescue seine to be lowered into water from a helicopter.

Conventional rescue gear, as for example the rubber life raft, while frequently offering great assistance in the rescue of survivors of shipwrecks or air crashes in the ocean, often fail to accomplished the main objective of moving said survivors to safety either before becoming seriously ill or dying as a result of exposure to the elements. Moreover, many survivors are already injured as a result of the original shipwreck or air crash and, in such an event, it is absolutely imperative that rescue be effected as promptly as possible in order to insure early medical treatment. With the advent of the rapid development of the helicopter type aircraft, an extremely rapid and yet effective means of securing the downed survivors became essential. Under these circumstances, it became necessary to develop some means of securing the survivor and, then, raising or hoisting him into the helicopter without further harm being done, even though he may be unconscious. Obviously, in the latter event, even a sling or any other similar arrangement previously utilized is not satisfactory where the survivor is required to perform some act in order to effect his rescue. In addition, the required rescue means must insure that the survivor is neither injured nor has any injury been aggravated as in the case of a burn or bone fracture.

It is an object of the invention, therefore, to provide a rescue device primarily designed to rescue survivors of shipwrecks and air crashes in the sea by air but easily adaptable for land rescue and movement of objects as well.

A further object of the invention resides in a rescue gear designed to effect a rescue in a unique manner fast in operation, simple in execution and yet positive and safe in accomplishing the main objective of saving life.

A still further object of the invention involves the provision of a rescue seine incorporating means to insure that the survivor rescued thereby is not injured or harmed in any way nor is any previous injury aggravated in any way.

Another object of the invention resides in the provision of a rescue gear which may be utilized for the transfer of objects and personnel on land as well as on sea.

An additional object of the invention provides a rescue apparatus which automatically assures that the rescued person is positively retained therein until he is hoisted or raised to a point of safety.

Other objects and advantages will become apparent from the following description, taken in connection with the accompanying drawings, in which like reference characters refer to like parts in the several figures.

Figure 1 is a somewhat schematic view of the rescue device of the invention, illustrating the rescue net in its fully lowered or open position.

Figure 3 is a third somewhat schematic view of the rescue device of Figures 1 and 2, illustrating the rescue net in its fully raised or closed position.

Figure 2:
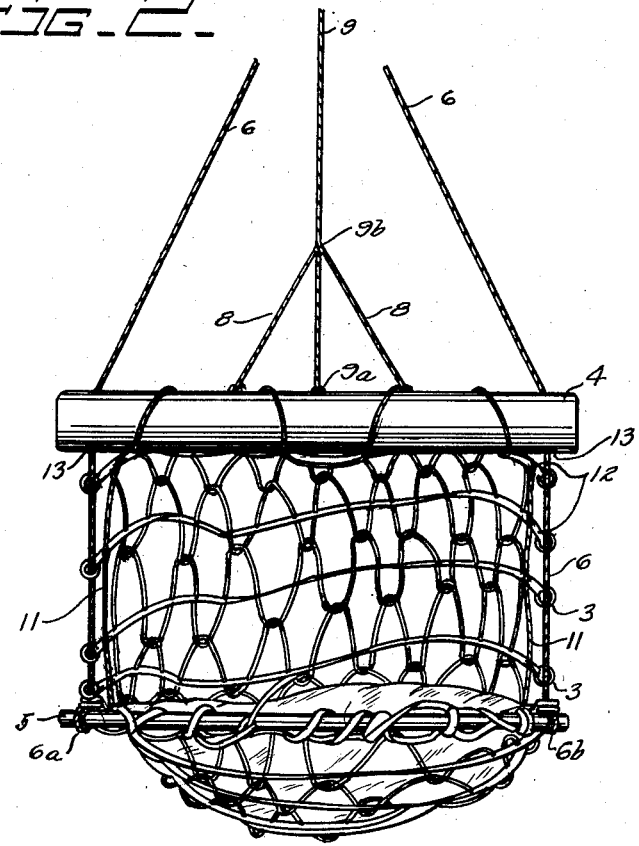
Figure 2 is a second somewhat schematic view of the rescue device of Figure 1, illustrating the rescue net in its partially raised position.

With particular reference to Figure 1 of the drawings, the rescue seine of the instant invention is indicated generally at 1 and includes a nylon mesh net indicated generally at 2, a plurality of steel rings 3 attached to said net 2 along both sides thereof, a floatation bar 4 attached to the upper end of said net, a sinking bar 5 attached to the lower end of said net, a first cable 6 for raising and lowering said sinking bar 5, a nylon operating line 7 attached as shown to said cable 6, two guy wires 8 attached as shown to said floatation bar 4, and a second cable 9 attached to the center of said bar 4 for raising and lowering the net 2 to which cable is attached the guy wires 8. The net 2 consists of a plurality of nylon ropes interwoven together to form a plurality of loops 10 when said net 2 is in either its fully extended position or is under load. Said net 2 also includes an edge line 11 extending around the periphery thereof to which edge line 11 are firmly attached a plurality of spaced web lines 12. Said web lines 12 extend transversely across the face of the net 2 interwoven between adjacent loops 10 and are firmly attached as stated previously to said edge line 11 on opposite sides of the net 2. Each end of each web line 12 extends beyond its points of attachment to said edge line 11 to which end a steel ring 3 is firmly attached. In this manner, each of said plurality of steel rings 3 is firmly anchored at spaced intervals to said edge line 11 along both sides of net 2.

Said net 2 is attached to the floatation bar 4 at the top and to the sinking bar 5 at the bottom. Said floatation bar 4 may consist of a hollow float spar made of either wood or aluminum as desired whereas said sinking bar 5 may be constructed of solid steel. Said floatation bar 4 includes openings or slots 13 extending completely therethrough adjacent each end thereof. The first cable 6 is threaded through each of said two slots 13 and said plurality of steel rings 3 on each side of said net 2. The two ends of said cable 6 are firmly anchored to said sinking bar 5 adjacent each end thereof at 6a and 6b, respectively. The floatation bar 4 may also include, if desired, a locking device 14 (hereinafter explained in detail with reference to Figure 4) within each of said slots 13 through which locking device 14 said cable 6 extends when in mounted condition. The second cable 9 is firmly anchored at 9a in the center region of the top of said floatation bar 4 for the purpose of lowering and lifting the net and load therein. The two guy wires 8 are anchored to said cable 9 at 9b to assist cable 9 in its support of a load.

When in operation the rescue seine 1 of the present invention is lowered from a helicopter, for example, with the cable 7 released to permit the sinking bar 5 to sink when the net 2 strikes the surface of the water and since the bar 4 will float on the surface of the water, the net 2 will fully extend to provide an open area of approximately 36 square feet as in Figure 1 of the drawings. With this arrangement, the open or pick-up area of said net 2 is approximately 6 feet by 6 feet; said net 2 is actually 2 feet wider and 2 feet longer than the size of said open or pick-up area in order to allow the net to form a "seine-like" shape behind the bars 4 and 5 and the cable 6. When a person downed in the water is spotted, the rescue seine 1 is lowered into the water as previously explained and then towed across the person to be rescued to dispose the person in the net or seine portion. The sinking bar 5 is then hoisted or raised by the cable 6 until said person is confined or locked in said rescue seine 1 at which time the entire load is hoisted to its fully raised position until a safe position is reached. Where the locking device of Fig. 4 is not utilized, the entire load is raised by means of the nylon operating line 7 which, through its connection to the cable 6, ensures that sinking bar 5 is retained in its fully raised position.

Referring specifically to Fig. 2 of the drawings, the rescue seine 1 is illustrated immediately after it has been towed across the object or person to be rescued. Said object or person which is shown schematically only has been caught in the mesh net 2, and the latter has assumed a "seine-like" shape. At this point, the sinking bar 5 is hoisted to its fully raised position as seen clearly in Figure 3 of the drawings at which time the rescued person is firmly locked within the rescue seine 1 and may then be raised to safety as previously explained. An important feature of the rescue seine 1 of the present invention resides in the provision of a simple, unique and, yet, effective system of insuring that the rescued person is not injured in the very act of being rescued. The latter is accomplished by means of two lower stop blocks 15 positioned on the cable 6 on both sides of said net 2 approximately 7" above the sinking bar 5. Said blocks 15 together with the plurality of steel rings 3 located on each side of said net 2 prevent the sinking bar 5 from fully closing against the floatation bar 4 and, in fact, provide a separation between said two bars 4 and 5 of approximately one (1) foot. In this manner, the danger of crushing the skull or limbs of an unconscious rescued person is eliminated. In addition to the stop blocks 15, two upper stop blocks 16 may be fixedly positioned on the second cable 6 as seen clearly in Fig. 1 which stop blocks 16 may be relocated or repositioned on said cable 6 in order to increase or decrease the distance between the upper and lower bars 4 and 5 and thereby change the size of the "seine-like" shape of the rescue seine 1.

Figure 4:
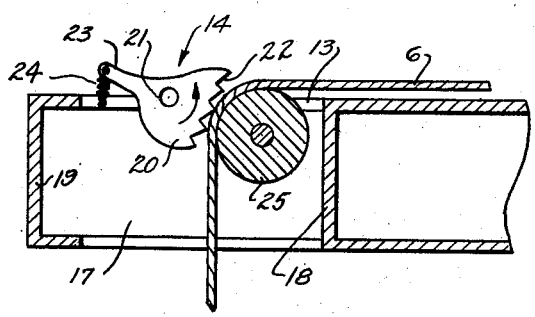
Figure 4 is a view partially in section taken about on line 4—4 of either Figures 2 or 3, showing the details of the locking device utilized in the device.

Referring particularly to Figure 4 of the drawings, there is illustrated an enlarged view of the locking device 14 utilized in the invention. Said locking device 14 is located partly inside and partly outside of the slot 13 adjacent each upper end of said floatation spar or bar 4, one end of which is clearly shown in Figure 4. As seen clearly in said Figure 4, the first cable 6 is carried into the upper or top portion of each slot 13 by means of the pulley 25 which pulley 25 then directs said cable 6 downwardly in a vertical direction towards the lower or bottom portion of the slot. Said pulley 25 is mounted within the floatation bar 4 in a chamber 17 formed by the intermediate wall 18 and the end wall 19 to project slightly above the upper opening of said slot 13 in order to properly receive the cable 6 and prevent the latter from engaging with the wall of said slot 13. In order to insure that the sinking bar 6 is automatically locked in place after being raised or hoisted to the closed position and thereby locking the rescued subject inside the rescue seine 1, the locking device 14 may be mounted on the top of said floatation bar 4 adjacent to each slot 13 as clearly seen in Figure 4. Said locking device 14 consists of a ratchet 20 pivoted at 21 to the upper wall surface of said bar 4 and designed with upwardly extending teeth 22. Said teeth 22 facilitate movement of said cable 6 in the upward direction only but prevent any movement in the opposite or downward direction. Thus, if the cable 6 should inadvertently release at any stage in the raising or hoisting of the sinking bar 5, said locking device 14 on each end of said floatation bar 4 automatically locks the cable 6 and the bar 5 in position. Said ratches 20 includes also an arm 23 and a very light coil spring 24 engaged between the end of said arm 23 and the upper surface of said floatation bar 4. Said coil spring 24 normally holds or retains the ratchet teeth 22 in engagement with said cable 6 so that the latter is moved upwardly during operation of the rescue seine 1 against the relatively light force of said spring 24 but if the cable 6 should attempt to reverse its movement, the teeth 22 immediately engage therewith to lock the same in place. When it is desired to release the locking device 14 from its engaged position with cable 6, it is only necessary to depress the end of said arm 23 in a downward direction in which case the ratchet 20 and ratchet teeth 22 are disengaged from said cable 6 due to the pivotal mount of said ratchet 20. In this manner, the sinking bar 5 may be released from its raised or closed position preparatory to effecting another rescue. When said locking device 14 is utilized, the cable 9 plus guy wires 8 are used to hoist the net 2 and its load.

To summarize the operation of the rescue seine of the instant invention, the rescue net 2 is lowered into the water by means of the nylon operating line 7, the floatation bar 4 rests on the surface of the water and the sinking bar 5 sinks beneath the water surface until said net 2 is fully open, said net 2 is dragged through the water by means of a helicopter, for example, until the rescued person is caught in said net 2, the latter is collapsed and said person is positively retained therein by means of the cable 6 raising the sinking bar 5, until it reaches the fully closed position, and finally the entire net 2 is hoisted to a safe position out of the water either by means of the cable 9 when the locking device 14 is utilized or, if the latter is not employed, by the nylon operating line 7.

Thus, a simple, unique and effective system of rescue has been developed by the rescue seine of the invention whereby the rescue of a wounded, unconscious, or extremely cold person is facilitated and effected within a minimum of elapsed time to thereby limit the time of exposure of the helicopter, crew, and cover aircraft to enemy fire when wartime conditions prevail.

I claim:

1. A rescue seine comprising a mesh net having an edge line around the periphery thereof, a plurality of spaced web lines interwoven in said net and extending transversely across said net from side-to-side, each of said web lines being firmly attached adjacent each end thereof to said edge line, a ring attached to each end of each web line and anchored thereto, a sinking bar attached to the bottom edge of said net, a floatation bar attached to the top edge of said net, a first cable attached at both ends to said sinking bar mounted on said floatation bar and extending through said plurality of rings on both sides of said net, a second cable attached to said floatation bar to raise and lower said net, said first cable operable to raise said sinking bar to its closed position to lock in a rescued person caught by said net.

2. A rescue seine as in claim 1, said floatation bar slotted at both ends to receive said first cable and having a pulley mounted in each end thereof over which said first cable is threaded to facilitate relatively frictionless movement therethrough.

3. A rescue seine comprising a mesh net having a hollow relatively light flotation bar on one end thereof and a relatively heavy sinking bar at the other end thereof, two openings incorporated in opposite ends of said floatation bar, a pulley mounted in each of said openings extending slightly outside of said openings, an automatic cam action locking device in each of said openings adjacent to said pulley, a primary cable threaded over said pulleys through said openings in engagement with said locking device and anchored to said sinking bar, a secondary cable attached to said floatation bar to raise and lower said net, said sinking bar descending below the surface of the water and said floatation bar resting on said surface to fully extend said rescue seine, said primary cable being operable to raise said sinking bar to its upper, closed position to lock the rescued person in said rescue seine, said locking device automatically inoperable by means of cam action to permit upward movement of said primary cable and automatically operable to prevent downward movement thereof.

4. A rescue seine as in claim 3, said locking device constituting a rotatably mounted ratchet having teeth normally in engagement with said primary cable, said ratchet teeth being cammed by said primary cable to rotate said ratchet in a nonlatching direction when said primary cable is raised towards its upper, closed position and in a latching direction when said primary cable attempts to move towards its downward, open position, said ratchet incorporating an arm extending above the upper surface of said floatation bar adjacent the end thereof, and a spring between said arm and said floatation bar, said spring normally urging said ratchet towards its cable engaging position, said arm being depressible against the force of said spring to release said locking device from engagement with said primary cable permitting said sinking bar to fall to its fully extended position.

5. A rescue seine comprising a mesh net, a floatation bar and a sinking bar on the upper and lower ends thereof, an edge line around the circumference of said net, a plurality of rings firmly attached at spaced intervals to said edge line along both sides of said net, a net hoisting cable affixed to said floatation bar, a net collapsing cable affixed to said sinking bar, and means insuring that a rescued person locked in said rescue seine is not injured thereby, said means comprising stop blocks positioned on said net collapsing cable at an intermediate location nearest to said sinking bar, said stop blocks together with said plurality of rings preventing said sinking bar from contact with said floatation bar by a predetermined distance when the former is raised towards its closed position to lock said rescued person in said rescue seine until a safe position has been reached.

6. A rescue seine for the rescue of a survivor downed in water comprising a mesh net, a floatation bar on one end of said net, a sinking bar on the other end of said net, a net lowering and lifting line adapted to be supported by a helicopter and affixed to said flotation bar, a net collapsing cable affixed to said sinking bar and adapted to be supported and controlled by means within said helicopter, and means locking said collapsing cable in its closed or partially closed position, said net lowering and lifting line being released to lower said net into said water, said floatation bar resting on the surface of said water and said sinking bar sinking beneath the surface of said water until said net has been extended to its fully opened position, said net collapsing cable being operable to raise said sinking bar to its upper, closed position to lock anyone caught therein in said net, and said net lowering and lifting line operable to hoist said net to a position of safety.

7. In a rescue seine for the rescue of survivors in water, a rescue net floatable at one end and sinkable at the other end, means for moving said sinkable end relative to said floatable end, means attached to said floatable end for lowering and raising said net in and out of said water, said means for moving said sinkable end relative to said floatable end comprising an interconnecting member attached to said sinkable end and adapted to be operable from within a helicopter to collapse said net into a seine-like shape substantially closed around a survivor to prevent the latter separating therefrom prior to reaching safety, and means for automatically assuring that said net is retained in its collapsed condition comprising a cam-operated element in operable engagement with said interconnecting member, said cam-operated element being cammed in one direction only to permit said interconnecting element to move towards its net-collapsing position and inoperable to prevent said interconnecting element from moving towards the net noncollapsed position.

8. In a rescue net, a collapsible mesh net having floatation means at one end and weight means at the other end and oppositely disposed cable-holding means on each side thereof between said floatation and weight means, net lowering and towing means attached to said floatation means, and net collapsing means attached to said weight means moving said weight means relative to said floatation means to close the pick-up area of said net, said net lowering and towing means consisting of a first cable attached to the mid-point of said floatation means and cable-bracing means attached to said first cable and to said floatation means on opposite sides of said mid-point, said net collapsing means consisting of a second cable extending through opposite ends of said floatation means and oppositely disposed cable-holding means and attached to opposite ends of said weight means to form a pair of parallel cable sections extending between said floatation and weight means on opposite sides of said net to ensure an open net pick-up area of predetermined size.

References Cited in the file of this patent

UNITED STATES PATENTS

| | | |
|---|---|---|
| 2,557,079 | Cutri | June 19, 1951 |
| 2,784,514 | Casson | Mar. 12, 1957 |